United States Patent
Guerard

[15] 3,673,698
[45] July 4, 1972

[54] PROCESS FOR FREEZE DRYING WITH CARBON DIOXIDE

[72] Inventor: Albert S. Guerard, 3181 Bird Rock Road, Pebble Beach, Calif. 93953

[22] Filed: Nov. 25, 1970

[21] Appl. No.: 92,791

[52] U.S. Cl. ................................................................34/5
[51] Int. Cl. .........................................................F26b 5/06
[58] Field of Search ..............................34/5, 10, 15, 92

[56] References Cited

UNITED STATES PATENTS 3,313,032  4/1967  Malecki .......................................34/5
1,976,204  10/1934  Voorhees et al. ...........................62/74

Primary Examiner—Frederick L. Matteson
Assistant Examiner—W. C. Anderson
Attorney—Eckhoff and Hoppe

[57] ABSTRACT

A continuous process is provided for the improved freeze drying of an aqueous solution to remove the water by sublimation from ice crystals to produce a dry product which can be reconstituted with water more readily than like products heretofore. Such aqueous solutions comprise coffee or tea syrups, fruit juices, milk, eggs, broths and the like.

4 Claims, 1 Drawing Figure

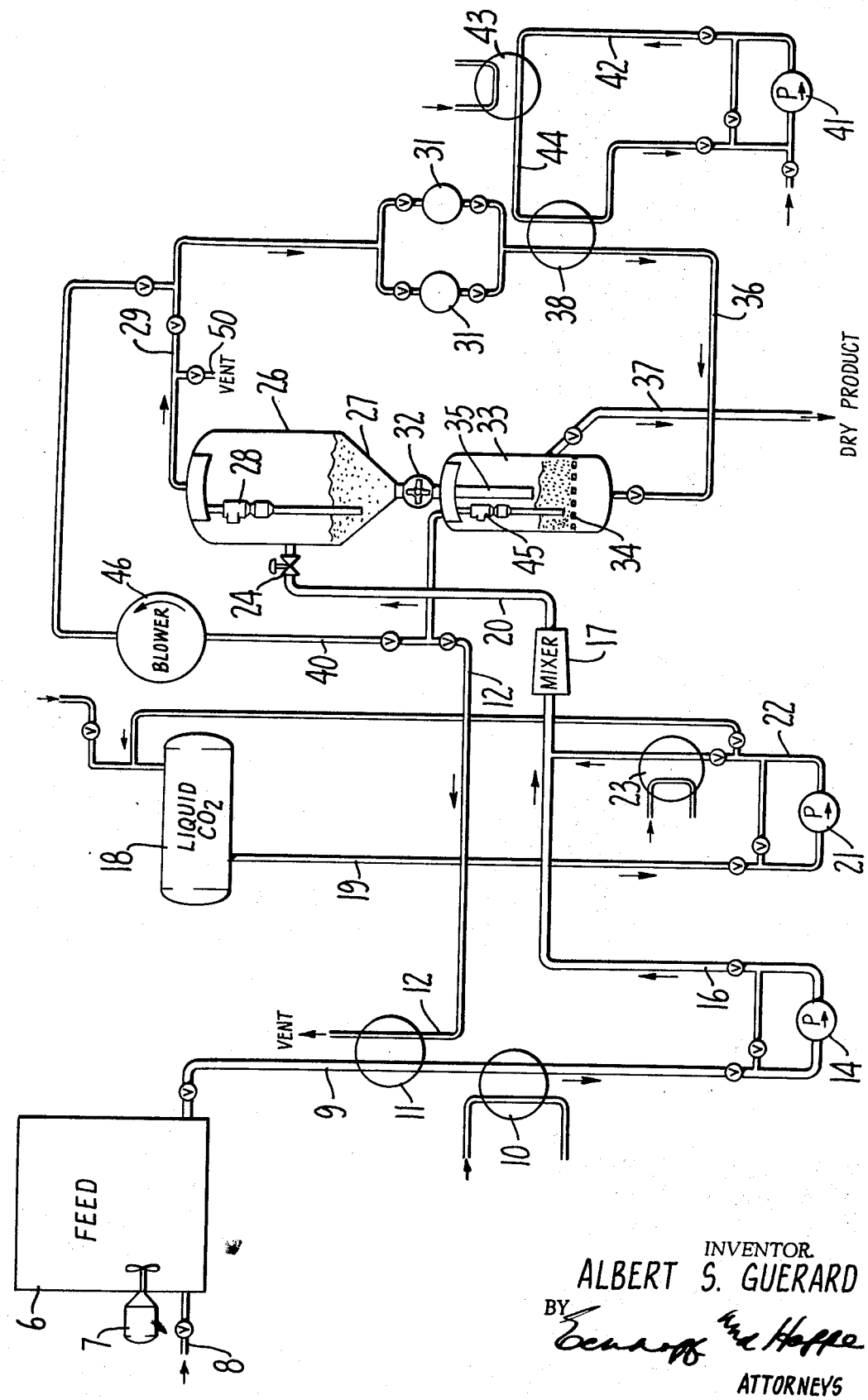

PROCESS FOR FREEZE DRYING WITH CARBON DIOXIDE

BACKGROUND OF THE INVENTION

It has been proposed heretofore to provide various solid substances in dry form by discharging the water solution of the substance into a low temperature region provided by the separate expansion of a refrigerant gas such as nitrogen, nitrous oxide or one of the family of fluorocarbons. Typical of these earlier operations are the teachings of the Delas U.S. Pat. No. 1,677,551 and Malecki U.S. Pat. No. 3,313,032.

I have found that the use of carbon dioxide is particularly advantageous because it has the property of subliming, that is going directly from the solid state to the gaseous state without going through a liquid state. Further, I have found the use of carbon dioxide is particularly advantageous when it is mixed in liquid form with the solution to be dried and the resultant mixture is then subjected to temperature and pressure conditions providing a rapid release of the pressure on the liquid mixture whereby a mixture is formed of carbon dioxide vapor and crystals containing solid carbon dioxide, water ice and the frozen constituents of the solution. These constituents are thereafter recovered in solid form free of water and carbon dioxide. The resultant dry solid product is characterized by the small size of the particles making up the product and a large surface area per unit of weight.

SUMMARY OF THE INVENTION

A continuous process is provided for the freeze drying of an aqueous solution whereby the solid content in the solution is recovered as a finely divided product of low unit weight per unit of volume. By utilizing the process of this invention, the following advantages are achieved:

1. moisture may be removed from a heat-sensitive product at a low temperature without affecting the quality of the product,
2. the freeze dried product is extremely porous and rapidly absorbs water during rehydration, ensuring rapid reconstitution,
3. weight savings are effected, and
4. the product may be stored and handled as any other packaged dry commodity at relatively low cost and without the use of refrigeration.

Carbon dioxide is utilized as the refrigerant because it is relatively inert and can be brought into direct contact with various foodstuffs without the formation of undesirable compounds which would adversely affect the taste, odor or color of the dried product. Further, the relatively high vapor pressure of carbon dioxide at ambient temperatures makes its complete removal from the dried product feasible. Additionally, carbon dioxide can be maintained in the liquid state at temperatures above the freezing point of water at relatively low pressures, e.g. about 600 pounds per square inch absolute. The adiabatic expansion of liquid carbon dioxide results in the conversion of the liquid to a mixture of solid carbon dioxide and gaseous carbon dioxide.

In brief, the process includes mixing of the liquid carbon dioxide with the solution to be processed. For example, this can be accomplished by mixing the liquid carbon dioxide at a pressure of about 600 pounds per square inch absolute and at a temperature of about 40°F. with the solution to be processed so that freezing of the water in the solution does not occur. Following creation of the co-mingled feed and carbon dioxide at a temperature above the freezing point of water at the existing pressure, the pressure on the mixture is then rapidly reduced as by release through an expansion valve. To achieve this, the mixture can be flashed into a vessel wherein the gaseous carbon dioxide is also separated from the solid crystals which form. The finely divided crystals which are formed consist of carbon dioxide and frozen feed stock. The solid crystals are then fed to a second vessel wherein the water ice and carbon dioxide are removed as by a suitable procedure. The final crystalline material is of such small particle size that the solid material behaves as a liquid, thereby making possible the utilization of the fluid bed technique to fluidize the crystals. Dry gaseous carbon dioxide is passed through the fluidized bed, the water present as ice subliming to water vapor which is carried away by the carbon dioxide gas which is fed to maintain the fluidized bed and the carbon dioxide which sublimes from the crystals.

It should be noted as a feature of this invention that by utilizing a liquid feed comprising liquid carbon dioxide and the liquid material to be frozen, I can achieve the formation of crystals each of which contains solid carbon dioxide, water ice and the solid components of the aqueous solution utilized. The presence of solid carbon dioxide in these crystals and the sublimation of the carbon dioxide to the gaseous phase enhances the sublimation of the water ice, thereby reducing the time required to freeze dry the feed material. The small crystal size achieved by this process provides a very large surface area per unit weight of material and, since sublimation can occur only at the surface of the material, the sublimation of the water ice and solid carbon dioxide is greatly enhanced. Further, the temperature gradient across individual crystals is minimized during sublimation. When the solid carbon dioxide and water ice are removed by sublimation, the solid particles remain in their original state. Further, the extremely quick freezing ensures the production of small crystals and reduces the formation of bacteria, mold or yeast growth. Further, irreversible biological changes which may occur as water freezes out of materials formed by slow freezing do not occur under these conditions.

A feature of this invention that represents a major improvement over the prior art is the capability of readily changing the process variables to successfully freeze dry a wide variety of aqueous solutions. Since liquid foods are water base, their freezing and boiling temperatures will be lower and greater, respectively, than the freezing and boiling temperatures of pure water. Also, many liquid foods such as coffee extract and orange juice contain constituents other than water that are combined with water to alter phase diagram characteristics. The phase diagram for pure water is well defined, and this phase diagram defines a pressure-temperature region where sublimation will occur, i.e., ice will change directly to vapor without passing through the liquid phase. At a vapor pressure not greater than about 4.5 millimeters of mercury, ice sublimes to vapor. In this process, the vapor pressure in the fluidized bed vessel is maintained at not greater than about 4 millimeters of mercury by using dry carbon dioxide gas as the fluidizing and water vapor removing medium.

The composition of most liquid foods is such that eutectic compositions are formed wherein at a particular temperature and concentration the material changes to the liquid state even though vapor pressure in the vessel is at or below the value of 4 millimeters of mercury. Under these circumstances, the process must have the capability of effecting a reduction in temperature and/or total pressure. For example, it has been found necessary to employ temperatures below −15°F. when freeze drying orange juice in order to avoid an eutectic that is reached at higher temperature. Similar considerations apply with respect to temperature and pressure control ahead of the expansion valve. If "free" or non-eutectic water is present in the feed stream, it is necessary to maintain a temperature above the freezing temperature of water at the pressure employed. Practical considerations to ensure that no water ice is formed in the feed line make it essential to maintain a temperature of the mixture not less than 8° to 10°F. above the freezing temperature of water. The temperature in the plenum vessel is controlled by varying the amount of liquid carbon dioxide mixed with the feed solution. The maximum allowable temperature is governed by the physical properties of the feed solution. For example, the freezing temperature of orange juice is about −41°F. and current practice is to freeze coffee extract (20 percent coffee by weight) at about −50°F. The temperature in the plenum vessel is controllable from about −100°F. to the maximum consistent with the formation of completely solid crystals free of liquid.

BRIEF DESCRIPTION OF THE DRAWING

In the drawing accompanying and forming a part hereof, the single FIGURE is a diagrammatic representation of apparatus and a flow sheet which can be utilized successfully in practicing the invention. Various control devices, e.g. pressure, temperature and flow regulators and like devices, valves and instrumentation, are not shown because these will be apparent to those skilled in the art.

DESCRIPTION OF THE PREFERRED EMBODIMENT

Referring to the drawing, the solution to be converted to a solid state is contained in feed tank 6 where it is maintained in a homogenous state by the mixer 7. Additional material is provided through the fill connection 8 as desired. Liquid material is withdrawn from the feed tank through line 9 and is passed through a heat exchanger 11 wherein heat exchange occurs with a stream of water vapor and carbon dioxide vapor in line 12. The feed material in line 9 is cooled by heat exchange 10 to about 40°F. The material in line 9 is forced by pump 14 through line 16 to a mixer 17.

Liquid carbon dioxide is derived from a tank 18 and is fed through line 19 to a pump 21 which in turn forces the liquid carbon dioxide on through line 22 through heat exchanger 23 into line 16 ahead of the mixer 17. Mixer 17 serves to mix the two liquid streams quite thoroughly before they are passed through line 20 to expansion valve 24 provided immediately adjacent a first pressure vessel 26. In pressure vessel 26, crystals are formed of solid carbon dioxide, water ice and the frozen solid contained in the water fed to the process. The crystals settle in the cone shaped bottom 27 of vessel 26. The carbon dioxide which does not solidify is removed through cyclone separators 28 and is passed through line 29 to dryers 31, a portion being vented as desired as at 50. Preferably the dryers are provided in parallel and contain a conventional drying agent such as silica gel, phosphorous pentoxide, activated alumina, calcium sulfate, or magnesium perchlorate, as well as those materials conventionally known as molecular sieves which are aluminosilicates or zeolites, the crystal of which contains minute pores and which have the ability to absorb relatively large volumes of water vapor. The dryers are operated sequentially, one being reactivated while the other is in use.

The crystals which collect in the bottom 27 of vessel 26 are fed through a power operated star valve 32 and pipe 35 into a second vessel 33 which includes a grid or screen 34 adjacent the lower end thereof. Dry carbon dioxide gas from the driers 31 is fed through line 36 into the bottom of vessel 33 to pass upwardly and fluidize and maintain the solid particles on the screen 34 in a fluidized state. Conventional "cyclones" or centrifugal separators 45 are provided in vessel 33 to prevent removal of solids from vessel 33. A portion of the sublimed water vapor and carbon dioxide vapor is vented through line 12 from the upper portion of the vessel 33 while the solid dried material is removed as the product through line 37. That portion of the mixed stream of sublimed water vapor and carbon dioxide which is not vented through line 12 is removed through line 40 and is passed to line 29 to ensure the presence of an adequate quantity of carbon dioxide for sublimation of the ice in vessel 33. Line 40 derives its stream of water vapor and carbon dioxide from cyclone separators 45 in vessel 33. Blower 46 is provided to increase the pressure in line 40 to a value equal to that in line 29.

The temperature of the stream of carbon dioxide gas issuing through from the driers 31 through line 36 is controlled by utilizing heat exchanger 38. Methanol, glycol or other low freezing point liquid is forced through a circulatory system which includes pump 41, line 42 passing to an heat exchanger 43 and thence through line 44 to the heat exchanger 38 to regulate the temperature of the dry carbon dioxide stream passing on to vessel 33.

In a typical operation utilizing a relatively heavy aqueous coffee infusion or syrup, the syrup was fed continuously through line 9 by pump 14 and was delivered to line 16 at a pressure of 600 pounds per square inch absolute and 40°F. Carbon dioxide derived from vessel 18 at a temperature of −20°F. and 200 pounds per square inch was fed to pump 21 and through heat exchanger 23 for delivery to line 16 at the same temperature and pressure, that is, 40°F. and 600 pounds per square inch absolute. The liquid mixture so formed was in the ratio of 1.8 pounds of carbon dioxide per pound of water present in the aqueous solution. The resultant mixture was then fed to the expansion valve and was permitted to flash in vessel 26 which was at a pressure of approximately 20 pounds per square inch. The pressure in vessel 26 exceeded that in vessel 33 by the amount sufficient to provide the pressure drop through the driers and piping. The dried coffee product was removed through line 37.

It should be noted that the preparation of aqueous extracts from certain vegetable materials may result in the loss of certain desirable volatile aromatic or fatty constituents. This is particularly significant in the case of coffee extract and various techniques have been employed to extract these volatile constituents prior to the preparation of the aqueous solution and to blend back the volatile aromatics into the finished dry product. U.S. Pat. No. 3,532,506 issued to Rey et al covers a method of extracting the aromatic and fatty constituents from roasted coffee by flowing gaseous or liquid carbon dioxide through the roasted and ground coffee and collecting the extract in solution in liquid carbon dioxide. Several methods of adding the solution to the coffee extract before or after drying are described.

The process covered by my invention permits an improved method of adding the volatile aromatic extract to the finished dry product. Since the aromatic extract is in a liquid carbon dioxide solution, it may be pumped into line 16 ahead of mixer 17. The crystals formed in vessel 26 will then contain a proportionate quantity of the volatile aromatic extract which will remain with the solid dry product following sublimation of the carbon dioxide and water vapor. This process ensures a more uniform and complete distribution of the aromatic and/or fatty constituents into the finished dry product, thereby improving the taste and aroma characteristics.

The same technique can be applied to any vegetable or fruit when the preparation of the aqueous extract may result in the loss of low boiling constituents and the resultant degradation of taste or aroma.

While various valves and controls are shown, other regulatory and manipulation devices will be apparent to those skilled in the art.

I claim:
1. The process of freeze drying material comprising:
   a. mixing an aqueous liquid infusion of the material with liquid carbon dioxide at a temperature and a first pressure whereat the mixture of the liquid and the carbon dioxide is a liquid;
   b. discharging the liquid mixture into a first zone which is at a second pressure substantially reduced with respect to the first pressure to produce carbon dioxide vapor and crystals of solid carbon dioxide and the frozen infusion;
   c. and removing the crystals to a second zone maintained at a third pressure and wherein the solid carbon dioxide and the water in the crystals sublime to leave a solid residue of the infusion free of water and carbon dioxide.

2. A process as in claim 1, wherein the crystals in the second zone form a bed in such second zone and dry carbon dioxide gas is passed upwardly through the bed of crystals to maintain the bed in a fluidized condition, the temperature and vapor pressure of the injected carbon dioxide being effective to cause sublimation of ice and solid carbon dioxide in the crystals, said temperature of injected carbon dioxide gas being insufficient to thaw the frozen solid residue of the infusion, and recovering the frozen solid residue free of water and carbon dioxide.

3. A process as in claim 1, wherein the carbon dioxide vapor in the first zone is removed, dried and then returned to the second zone wherein the dry carbon dioxide gas is passed upwardly through the bed of crystals to maintain the bed in a fluidized condition, the temperature and vapor pressure of the injected carbon dioxide being effective to cause sublimation of ice and solid carbon dioxide in the crystals, the temperature being insufficient to thaw the frozen solid residue of the infusion, and recovering the frozen solid residue free of water and carbon dioxide.

4. The process of freeze drying material comprising:
a. mixing an aqueous liquid infusion of the material to be freeze dried with an inert, nonreactive, nontoxic, normally gaseous material at a temperature and a first pressure whereat the mixture of the liquid infusion and the normally gaseous material is a liquid;
b. discharging the liquid mixture of normally gaseous material and liquid infusion into a first zone and freezing the liquid mixture in said first zone to produce solid crystals of said normally gaseous material and the liquid infusion;
c. and transferring the solid crystals of normally gaseous material and liquid infusion to a second zone maintained at a pressure and temperature whereat the normally gaseous material and the water in the solid crystals sublime to leave a solid residue of the infusion free of water and said normally gaseous material to thus freeze dry said material.

* * * * *